March 8, 1938.  E. C. ALDRICH  2,110,640
UTILITY IMPLEMENT OR ARTICLE
Filed July 16, 1935
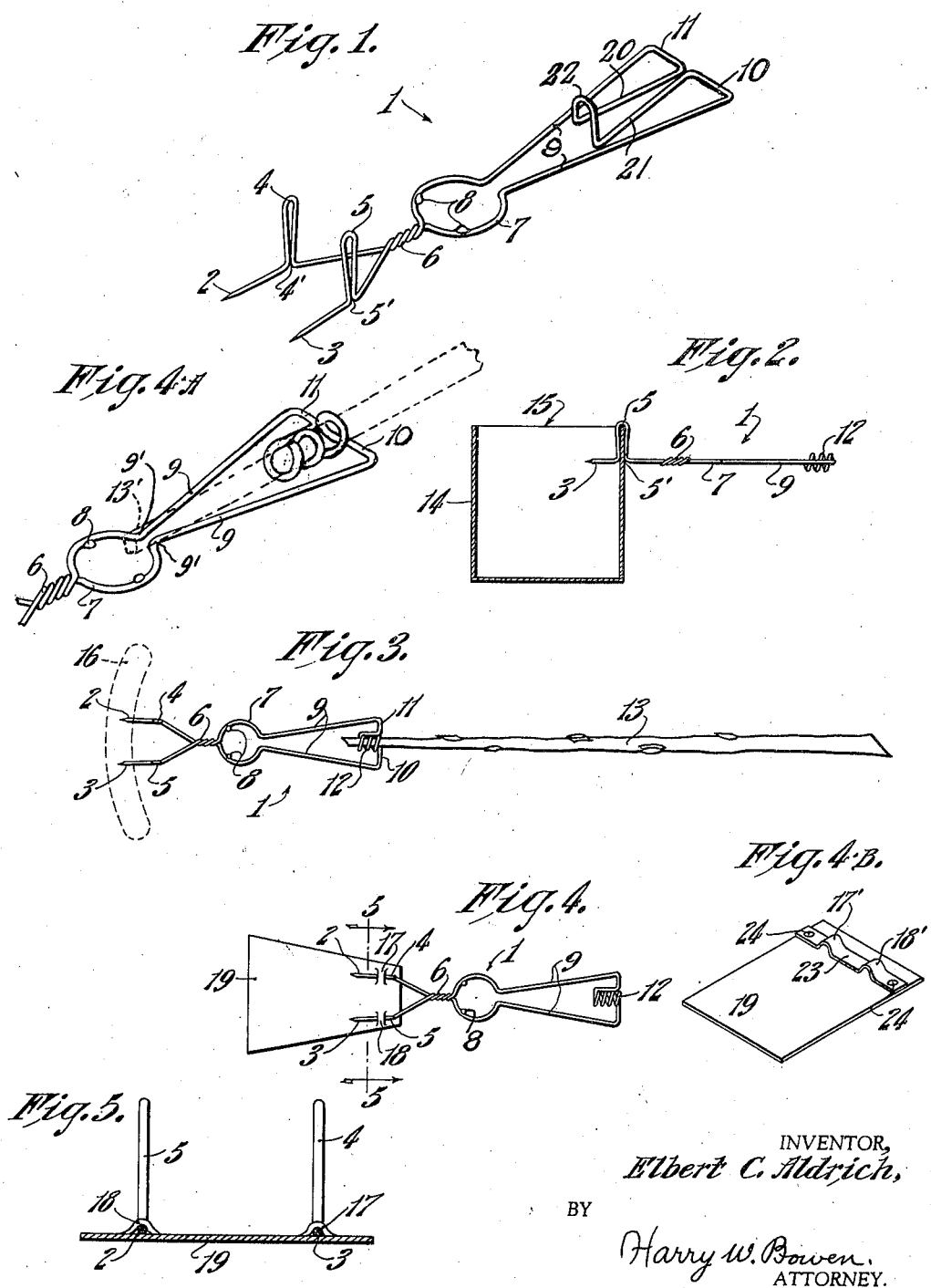
INVENTOR,
Elbert C. Aldrich,
BY
Harry W. Bowen.
ATTORNEY.

Patented Mar. 8, 1938

2,110,640

UNITED STATES PATENT OFFICE 2,110,640

UTILITY IMPLEMENT OR ARTICLE

Elbert C. Aldrich, Granby, Mass.

Application July 16, 1935, Serial No. 31,587

3 Claims. (Cl. 294—33)

This invention relates to improvements in utility implements or articles, and is particularly designed for use in outdoor cooking and preparation of food, and for other uses and purposes, as will be explained.

An object of the invention is to provide a light weight, compact implement, which combines, in a single unit, the functional characteristics of several implements now used for the same purposes.

The invention herein disclosed combines, in a single unit, the functional characteristics of a cooking fork, a roasting fork, a bottle opener, and a holder, or handle for lifting cooking utensils, to avoid burning one's hands. It is particularly advantageous for use in camping, picnics, hiking, or trailing, touring, etc., as it materially reduces the number, weight, space occupied, and handling, for such implements ordinarily found necessary for such purposes.

Broadly, my invention comprises a unitary implement formed from a single strand of wire and provided with a pair of fork tines, a pair of gripping members for holding, or lifting, a can, pot, kettle, or similar article, a ring portion adapted for use in opening a bottle, and a handle portion, incorporating a socket for receiving a temporary handle projection, such as a stick cut from shrubbery, or undergrowth.

The objects and advantages of my invention will be more completely disclosed and described in the following specification, the accompanying drawing, and the appended claims.

A preferred embodiment of my invention is illustrated in the accompanying drawing, in which:—

Fig. 1 is a perspective view of the implement.

Fig. 2 is a side elevational view of the implement in use, as a handle, or holder, for a cooking utensil.

Fig. 3 is a plan view of the implement in use, as a roasting or toasting fork.

Fig. 4 is a plan view of the implement in use, as a flap jack turner, and

Fig. 4ᴬ and 4ᴮ are views of modifications.

Fig. 5 is a sectional view on the line 5—5 of Fig. 4.

Referring now to the drawing in detail, in which like numerals refer to like parts throughout:—

The implement 1 is formed from wire of suitable size and temper, and the extremities of the wire are sharpened to provide the oppositely disposed fork tines 2 and 3. Immediately back of the tines 2 and 3, the wire is bent upwardly, looped, and returned on itself to form the oppositely disposed clamping or gripping portions 4 and 5, with the narrow and closed neck portion, or passages 4' and 5'. Rearwardly of the gripping portions 4 and 5, the wire converges to the center line of the implement and is twisted at 6 to provide a rigid, reinforcing portion. Back of the twisted portion 6, the wire is formed into a ring 7, which is provided with nubs, or projections 8, the ring 7, and nubs 8 being designed for use in removing the caps from bottles, by an upward pressure in the usual way. From the rear of the ring 7, the wire is extended, tapering, or spreading, outwardly from the center line, to form a handle portion 9, at the rear extremity of which the wire is turned inwardly at 10 and 11, and formed in an open coil 12, as shown. The coil 12 provides a socket for receiving a handle extension 13, as indicated in Fig. 3.

Fig. 2 is illustrative of the use of the implement 1, as a convenient handle for a cooking utensil 14. The looped portions 4 and 5 are forced downwardly over the rim, or lip portion 15 of the utensil 14, as indicated, and thus the member 1 is firmly, but removably secured, on the utensil 14, by reason of the narrow neck portions 4' and 5'.

Fig. 3 is illustrative of the use of the implement 1, as a roasting fork, or the like. A temporary handle extension 13 may be inserted in the socket 12, and an article 16 to be roasted, toasted, grilled, boiled, or otherwise cooked, may be impaled on the tines 2 and 3.

Figs. 4 and 5 are illustrative of the use of the implement 1, as a pancake turner, cake knife, or the like. The tines 2 and 3 are inserted in sockets 17 and 18, formed in a flat plate 19, with the portions 4 and 5 impinging against the sockets 17 and 18.

Whereas, I have indicated in the drawing, a few of the typical uses of the invention, it will be understood, by those skilled in the art, that this implement is adaptable for many other uses in camp work, such as an ordinary cooking fork, in the preparation of food, a hanger for clothing, or other articles, which may be held in the portions 4 and 5, etc., and I do not confine myself to the functional characteristics herein described, but claim all the uses to which this implement may be adapted.

Referring to the construction shown in Fig. 4ᴬ, the handle part 9, instead of being formed with the coil 12, is extended inwardly from the ends 10 and 11, with the portions 20 and 21 in the plane of the handle and then bent upwardly to form the loop, or bend 22, through which the temporary handle 13 is inserted, the inner end 13' of which rests on the narrow portions 9' of the handle, thus forming a support for the implement, which co-operates with the loop 22.

In Fig. 4ᴮ, instead of forming the socket loops 17 and 18 in the metal itself, of the plate 19, I use a strip of thin metal 23 that is secured to the plate 19 with the rivets 24. This strip is formed with the socket loops 17' and 18'.

What I claim is:—

1. As an article of manufacture, for the purpose described, comprising, a one-piece wire member of springy material having oppositely located and normally closed two-looped portions only in parallel planes for gripping the upper edge of a utensil with the open end of the utensil uppermost, and a handle portion connected to the looped portions, said handle having a closed rear end, an open upwardly extended semi-circular loop to receive an extension handle member, spaced from said rear end.

2. A utility article, for the purpose described, normally closed spring loops but separable for frictionally gripping an upper edge of an article, as a cooking utensil, an integral handle portion, and integral inwardly extended loop means positioned between the end of the handle and said loops for removably attaching an extension member.

3. In a combination implement of wire, a pair of spaced, normally closed but separable spring loops for detachably engaging an edge of a receptacle, the wire from the bases of said loops converging rearwardly and being twisted at their intersection, then continuing rearwardly from said twisted portion in splayed relation to the rear end of the implement, thence returning on themselves to a point midway between the rear end and said twisted portion, at which point said wires are joined in a semi-circular loop, said loop and said spring loops lying in parallel planes which are perpendicular to the normal plane of the implement.

ELBERT C. ALDRICH.